(12) United States Patent
Patton et al.

(10) Patent No.: US 9,047,583 B2
(45) Date of Patent: Jun. 2, 2015

(54) ONTOLOGY CONTEXT LOGIC AT A KEY FIELD LEVEL

(75) Inventors: Richard D. Patton, St. Paul, MN (US); Richard Lawson, Dallas, TX (US)

(73) Assignee: Lawson Software, Inc., St. Paul, MN (US)

( * ) Notice: Subject to any disclaimer, the term of this patent is extended or adjusted under 35 U.S.C. 154(b) by 1661 days.

(21) Appl. No.: 10/857,270

(22) Filed: May 28, 2004

(65) Prior Publication Data

US 2005/0267773 A1 Dec. 1, 2005

(51) Int. Cl.
*G06F 7/00* (2006.01)
*G06Q 10/10* (2012.01)

(52) U.S. Cl.
CPC ........................ *G06Q 10/10* (2013.01)

(58) Field of Classification Search
USPC .................................. 707/102, 758
See application file for complete search history.

(56) References Cited

U.S. PATENT DOCUMENTS

| | | | |
|---|---|---|---|
| 6,418,447 B1* | 7/2002 | Frey et al. ............... | 707/103 R |
| 6,789,252 B1* | 9/2004 | Burke et al. .............. | 717/100 |
| 7,093,200 B2* | 8/2006 | Schreiber et al. .......... | 715/835 |
| 2002/0023261 A1* | 2/2002 | Goodwin et al. .......... | 717/146 |
| 2002/0092004 A1 | 7/2002 | Lee et al. ................. | 717/140 |
| 2003/0163597 A1* | 8/2003 | Hellman et al. ........... | 709/316 |

FOREIGN PATENT DOCUMENTS

WO    WO-2005119433 A2    12/2005

OTHER PUBLICATIONS

Eden, "A Theory of Object-Oriented Design," Information Systems Frontiers 4:4, 379-391, Kluwer Academic Publishers, 2002.*
Lee, Ken W., "An Introduction to Aspect-Oriented Programming", *COMP 610E 2002 Spring Software development of E-Business Applications*, Reading Assignment from the Hong Kong University of Science and Technology,(2002),1-16.
Udell, Jon , "Aspects revisited", *InfoWorld* (Jul. 18, 2003),1-3.
Vasters, Clemens , "Year With Aspects", *Clemens Vasters: Enterprise Development & Alien Abductions*, Blog excerpts from Jun. 10-30, 2003,1-12.

* cited by examiner

*Primary Examiner* — Cheyne D Ly
(74) *Attorney, Agent, or Firm* — Blank Rome LLP

(57) ABSTRACT

In one embodiment, a method includes creating a key field on a machine-readable medium. The key field has an ontology logic that includes a context for a business class and an equivalency between the key field and a business class. The method also includes creating the business class on the machine-readable medium. The business class has an ontology logic that includes the equivalency between the key field and the business class.

27 Claims, 14 Drawing Sheets

COMPANY IS A BUSINESSCLASS  /—200

202 — ONTOLOGY
　　203 — SYMBOLIC KEY IS COMPANY

204 — PATTERNS
　　205 — IMPLEMENTS CRUD

206 — PERSISTENT FIELDS

207 — NAME IS ALPHA SIZE 30

*Fig. 2A*

COMPANY IS A KEYFIELD  /—220

222 — REPRESENTATION
　　223 — TYPE IS NUMERIC SIZE 4

224 — ONTOLOGY
　　226 — BUSINESS CLASS IS COMPANY

*Fig. 2B*

HRCOMPANYDATA IS A BUSINESSCLASS                                    ⌐300

302 — ONTOLOGY
     303 — SYMBOLIC KEY IS HRCOMPANY

304 — PATTERNS
     305 — IMPLEMENTS CRUD

306 — PERSISTENT FIELDS
     310 — NAME         IS ALPHA SIZE 50
     311 — LASTEMPLOYEE   IS NUMERIC SIZE 9
           AUTOSEQUENCE   IS ALPHA SIZE 1
     312 —{                STATES
                            YES VALUE IS "Y"
                            NO VALUE IS "N"

308 — FIELD RULES
     314 — NAME REQUIRED
     316 —{ AUTOSEQUENCE
               DEFAULT TO AUTOSEQUENCE.NO

*Fig. 3A*

HRCOMPANY IS A KEYFIELD    ⌐320
  322 — EXTENDS COMPANY

324 — ONTOLOGY
     326 — BUSINESS CLASS IS HRCOMPANYDATA

*Fig. 3B*

EMPLOYEEMASTER IS A BUSINESSCLASS  ⟵ 400

402 — ONTOLOGY
    404 — SYMBOLIC KEY IS EMPLOYEE

406 — PATTERNS
    408 — IMPLEMENTS CRUD

410 — PERSISTENT FIELDS
    412 — {
      NAME                  IS ALPHA SIZE 50
      ADDRESS
      WORKCOUNTRY       IS A COUNTRYCODE
      PRIMARYPAYAREA    IS A PAYAREA
      SECONDARYPAYAREA  IS A PAYAREA
    }

414 — DERIVED FIELDS
    416 — { STANDARDWEEKLYPAY IS A COMPUTERFIELD
            (PRIMARYPAYAREA.PAYCODE.PAYRATE * 40) }

418 — FIELD RULES
    420 — {
      NAME                  REQUIRED
      ADDRESS            REQUIRED
      WORKCOUNTRY       REQUIRED
      PRIMARYPAYAREA    REQUIRED
    }

*Fig. 4A*

EMPLOYEE IS A KEYFIELD  ⟵ 430

432 — REPRESENTATION
    434 — TYPE IS NUMERIC SIZE 9

436 — ONTOLOGY
    438 — BUSINESS CLASS IS EMPLOYEEMASTER

440 — CONTEXT
    442 — { HRCOMPANY
           DELETE RESTRICTED }

444 — FIELD RULES
    446 — { EMPLOYEE
         IF (COMPANY.AUTOSEQUENCE.YES)
            AUTOSEQUENCE USING COMPANY.LASTEMPLOYEE }

*Fig. 4B*

EMPLOYEEDEPENDENT IS A BUSINESSCLASS

452 — ONTOLOGY
     454 — PART OF EMPLOYEEMASTER
         456 — RELATIVE KEY IS NAME IS ALPHA SIZE 30

458 — PATTERNS
     460 — IMPLEMENTS CRUD

462 — PERSISTENT FIELDS
     464 — BIRTHDATE IS DATE

466 — DERIVED FIELDS
            AGE IS A COMPUTEFIELD
     468 —   TYPE IS NUMERIC SIZE 2
            (CURRENT DATE − BIRTHDATE)

*Fig. 4C*

PAYCODETABLE IS A BUSINESSCLASS  ⟵ 500

502 ⟶ ONTOLOGY
    504 ⟶ SYMBOLIC KEY IS PAYCODE

506 ⟶ PATTERNS
    508 ⟶ IMPLEMENTS CRUD

510 ⟶ PERSISTENT FIELDS
    512 ⟶ { DESCRIPTION IS ALPHA SIZE 50
              PAYRATE     IS DECIMAL SIZE 4.4

*Fig. 5A*

PAYCODE IS A KEYFIELD  ⟵ 520

522 ⟶ REPRESENTATION
    524 ⟶ TYPE IS ALPHA SIZE 5

526 ⟶ ONTOLOGY
    528 ⟶ BUSINESS CLASS IS PAYCODETABLE

530 ⟶ CONTEXT
    532 ⟶ HRCOMPANY
    534 ⟶ COUNTRYCODE
                  OPTIONAL
    536 ⟶ REGION
                  OPTIONAL

*Fig. 5B*

COUNTRY IS A BUSINESSCLASS ⟋— 600

602 — ONTOLOGY
      604 — SYMBOLIC KEY IS COUNTRYCODE

606 — PATTERNS
      608 — IMPLEMENTS CRUD

610 — PERSISTENT FIELDS
      612 — NAME IS ALPHA SIZE 50

*Fig. 6A*

COUNTRYCODE IS A KEYFIELD ⟋— 620

622 — REPRESENTATION
      624 — TYPE IS ALPHA SIZE 2

626 — ONTOLOGY
      628 — BUSINESS CLASS IS COUNTRY

*Fig. 6B*

REGION IS A BUSINESSCLASS    ⟋—700

702 — ONTOLOGY
      704 — SYMBOLIC KEY IS REGION

706 — PATTERNS
      708 — IMPLEMENTS CRUD

710 — PERSISTENT FIELDS
      712 — NAME IS ALPHA SIZE 50

713 — FIELD RULES
      714 — NAME REQUIRED

*Fig. 7A*

REGION IS A KEYFIELD    ⟋—720

722 — REPRESENTATION
      724 — TYPE IS ALPHA SIZE 10

726 — ONTOLOGY
      728 — BUSINESS CLASS IS REGION

730 — CONTEXT
         COUNTRYCODE
            DELETE CASCADES

*Fig. 7B*

ONTOLOGY CONTEXT LOGIC AT A KEY FIELD LEVEL

COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

TECHNICAL FIELD

The application relates generally to the field of software, more particularly, to ontology context logic at the key field level for development and execution of software.

COMPUTER PROGRAM LISTING APPENDIX

A computer program listing is found in Appendices A through M, which are incorporated herein by reference:

Appendix A—Class Definition for a Symbolically-keyed Object Representative of a Company, submitted in an electronic text file named "Appendix_A.txt," created Apr. 22, 2015, 18 kilobytes.

Appendix B—Class Definition for a Key Field of a Company, submitted in an electronic text file named "Appendix_B.txt," created Apr. 22, 2015, 3 kilobytes.

Appendix C—Class Definition for a Symbolically-keyed Object Representative of Human Resources Data, submitted in an electronic text file named "Appendix_C.txt," created Apr. 22, 2015, 21 kilobytes.

Appendix D—Class Definition for a Key Field Representative of a Human Resources Data, submitted in an electronic text file named "Appendix_D.txt," created Apr. 22, 2015, 3 kilobytes.

Appendix E—Class Definition for a Symbolically-keyed Object Representative of an Employee, submitted in an electronic text file named "Appendix_E.txt," created Apr. 22, 2015, 27 kilobytes.

Appendix F—Class Definition for a Key Field Representative of an Employee, submitted in an electronic text file named "Appendix_F.txt," created Apr. 22, 2015, 3 kilobytes.

Appendix G—Class Definition for a Symbolically-keyed Object Representative of a Dependent of an Employee, submitted in an electronic text file named "Appendix_G.txt," created Apr. 22, 2015, 24 kilobytes.

Appendix H—Class Definition for a Symbolically-keyed Object Representative of a Pay Code, submitted in an electronic text file named "Appendix_H.txt," created Apr. 22, 2015, 26 kilobytes.

Appendix I—Class Definition for a Key Field Representative of a Pay Code, submitted in an electronic text file named "Appendix_I.txt," created Apr. 22, 2015, 4 kilobytes.

Appendix J—Class Definition for a Symbolically-keyed Object Representative of a Country, submitted in an electronic text file named "Appendix_J.txt," created Apr. 22, 2015, 18 kilobytes.

Appendix K—Class Definition for a Key Field Representative of a Country, submitted in an electronic text file named "Appendix_K.txt," created Apr. 22, 2015, 3 kilobytes.

Appendix L—Class Definition for a Symbolically-keyed Object Representative of a Region, submitted in an electronic text file named "Appendix_L.txt," created Apr. 22, 2015, 19 kilobytes.

Appendix M—Class Definition for a Symbolically-keyed Object Representative of a Region, submitted in an electronic text file named "Appendix_M.txt," created Apr. 22, 2015, 3 kilobytes.

BACKGROUND

Creation of software applications, which includes design, development, and testing of the code, is typically an iterative process. Testing may find errors in the design and/or the development of the code. Accordingly, the design and/or development of the code are updated to correct such errors. The amount of time of such processes is, therefore, typically dependent on the size of the software application and how well such processes are performed. In addition to the debugging of the code, updates are typically made to the design and/or development to add additional features to the software application.

A number of different paradigms for the design and development of software applications have attempted to reduce the time of these processes. Such paradigms have included procedural programming, functional programming, object-oriented programming, aspect-oriented programming, and so on. Disadvantageously, designers and developers using these different paradigms have had difficulty identifying the effect(s) that an update or incorporation of an additional feature has on the existing code. In general, this comes from the high level of complexity inherent in modeling sophisticated business processes in general programming or "implementation" languages.

Specific to a business application, the purpose of such an application is to help automate business processes. A business process is a recurring pattern of interactions among human agents. Business processes evolve over time through a series of adaptations to changes in the environment. A business process is a complex adaptive system. A business application may be a model of that complex adaptive system at any point in time. One aspect of a business application is that it should be flexible enough to adapt and evolve in step with the adapting and evolving business process that it is modeling. If an application is not flexible enough to evolve it is considered to be rigid and brittle and should be replaced.

The lack of flexibility of a business application comes about because of the inherent rigidity of general programming languages when they are used to model multi-dimensional problems. In general, the problem is that each interaction of each dimension should be explicitly codified in the language. There have been some improvements to this situation starting with parameterized functions, then object-oriented programming and most recently aspect-oriented programming. None of these approaches have overcome the mechanical rigidity inherent in general purpose computing languages.

BRIEF DESCRIPTION OF THE DRAWINGS

Embodiments of the invention may be best understood by referring to the following description and accompanying drawings which illustrate such embodiments. The numbering scheme for the Figures included herein is such that the leading number for a given reference number in a Figure is associated with the number of the Figure. For example, a key field 102 can be located in FIG. 1. However, reference numbers are the same for those elements that are the same across different Figures. In the drawings:

FIG. 2A illustrates a class definition for a symbolically-keyed object representative of a company in a business application, according to some embodiments of the invention.

FIG. 2B illustrates a class definition for a key field having an ontology logic and representative of a company in a business application, according to some embodiments of the invention.

FIG. 3A illustrates a class definition for a symbolically-keyed object representative of a human resources data in a company in a business application, according to some embodiments of the invention.

FIG. 3B illustrates a class definition for a key field having an ontology logic and representative of human resources in a company in a business application, according to some embodiments of the invention.

FIG. 4A illustrates a class definition for a symbolically-keyed object representative of an employee in a company in a business application, according to some embodiments of the invention.

FIG. 4B illustrates a class definition for a key field having an ontology logic and representative of an employee in a company in a business application, according to some embodiments of the invention.

FIG. 4C illustrates a class definition for a symbolically-keyed object representative of a dependent of an employee in a company in a business application, according to some embodiments of the invention.

FIG. 5A illustrates a class definition for a symbolically-keyed object representative of a pay code in a company in a business application, according to some embodiments of the invention.

FIG. 5B illustrates a class definition for a key field having an ontology logic and representative of a pay code in a company in a business application, according to some embodiments of the invention.

FIG. 6A illustrates a class definition for a symbolically-keyed object representative of a country in a business application, according to some embodiments of the invention.

FIG. 6B illustrates a class definition for a key field representative of a country code in a business application, according to some embodiments of the invention.

FIG. 7A illustrates a class definition for a symbolically-keyed object representative of a region in a business application, according to some embodiments of the invention.

FIG. 7B illustrates a class definition for a key field representative of a region in a business application, according to some embodiments of the invention.

DETAILED DESCRIPTION

Figure 1:
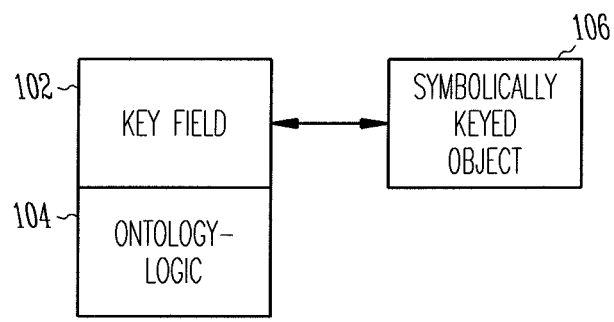
FIG. 1 illustrates a diagrammatic representation of a relationship between a key field and a symbolically-keyed object, according to some embodiments of the invention.

Methods, apparatus and systems for ontology context logic at the key field level are described. In the following description, numerous specific details are set forth. However, it is understood that embodiments of the invention may be practiced without these specific details. In other instances, well-known circuits, structures and techniques have not been shown in detail so as not to obscure the understanding of this description.

What may be required to overcome the mechanical rigidity inherent in general purpose computing languages is a more specialized design or pattern language that explicitly addresses the dimensionality problem related to how the ontology of the business application is modeled and implemented. Some embodiments of the invention allow for such a design or pattern language. One problem with the current approach is highlighted by how the analysis model and the actual implementation of that analysis model become completely disconnected from each other. It is as though a building is built from a blueprint but in the end the actually built building looks nothing like the blueprint.

Some embodiments of the invention overcome the ontology dimensionality problem and the analysis model/implementation disconnect problem. Such embodiments do this by tying several key concepts into a unique methodology for defining the ontology of the system which allows the ontology logic to be explicitly defined in one place and implicitly referred to at all appropriate dimensional intersections. The first concept is that an entity in the system should not be defined by its "boundary" (its "complete" definition) but rather it should be defined by its "center" (its aseity or "thisness"). The second concept is that this center itself is defined in terms of its ontological context (its affordance structure). The ontological context itself being made up of other centers within the system. The third concept is that this center is responsible for and thus capable of discovering what context it exists within in order to "adapt" appropriately to that environment. This is in essence a denial of the mechanical metaphor which insists on a rigid context insensitivity. It is rather an embracing of the organic metaphor in which any entity exhibits a very high degree of context sensitivity to its environment. Embodiments of the invention allow for a shift from a mechanical implementation language to a context sensitive design language.

In some embodiments of the invention, entities are modeled as business objects or sets of business objects. The center of a business object or set of business objects may be a new construct called a key field. A key field is a field that knows within itself what business object or set of business objects it is the center for. Additionally, a key field may know what other key fields should (or may) be present within the context it finds itself in. The key field knows how to search for other key field and knows how to direct the various behaviors required in order to maintain the integrity of whatever specific ontological rules are appropriate given the patterns it implements and the structures it finds itself within. With these capabilities the key field may be placed within some other business object that is capable of affording it and the rules that would normally need to be codified at that dimensional intersection are implicitly delegated to the key field. The key field may also automatically discovers its context and then based on that context executes the appropriate logic.

Embodiments of the invention include a design pattern language that defines structures (such as objects and key fields) relative to each other. Embodiments of the invention define logic at the field (key field) level. As further described below, a key field is a symbolic way of referring to a business class. In some embodiments, there is a one-to-one relationship between a business class and a key field. Logic at the key field may include the context for a given class. Logic may include an equivalency between the key field and a business class. Additionally, logic may include a context for a class.

Code may be created based on the design pattern language. This design pattern language code may be parsed to determine whether rules of the design pattern language have been followed during the creation of the design pattern language code. For example, assume that a key field related to a business object includes a given context. If the business object is not defined in such a context, an error may be generated during the parsing of the design pattern language. Additionally, object-oriented code (such as JAVA and C++) may be generated based on the design pattern language code. Accordingly, embodiments of the invention allow for design and coding of code relatively much faster in comparison to conventional design and coding operations.

FIG. 1 illustrates a diagrammatic representation of a relationship between a key field and a symbolically-keyed object, according to some embodiments of the invention. FIG. 1 includes a key field 102 and a symbolically-keyed object 106. The key field 102 also includes an ontology logic 104. In some embodiments, the key field 102 and the symbolically-keyed object 106 may be instantiated objects of a given object-oriented class.

As shown, there is logic at the key field level—the ontology logic 104. In some embodiments the ontology logic 104 may define an equivalency between the key field 102 and the symbolically-keyed object 106. Although not shown, the symbolically-keyed object 106 may also include an equivalency between the key field 102 and the symbolically-keyed object 106. In some embodiments, the key field 102 may be three different types of structures: simple, group, and array.

Additionally, the ontology logic 104 may include context for the symbolically-keyed object 106. For example, assume that the symbolically-keyed object 106 is representative of a region in a country. Accordingly, the context for the symbolically-keyed object 106 may be the country in which the region is located. As described, logic in the system being coded is defined at the key field level rather than at the business object level.

Figure 8:
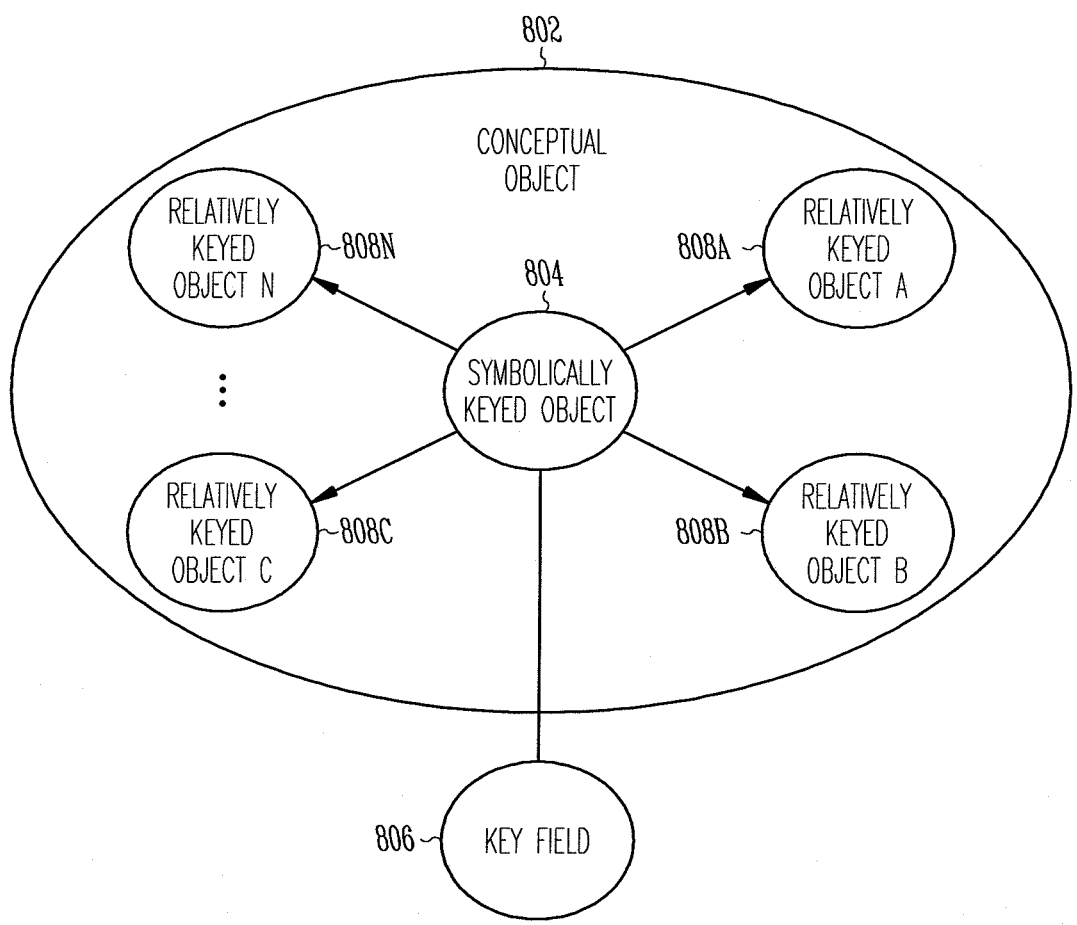
FIG. 8 illustrates a diagrammatic representation of a relationship between a key field, a symbolically-keyed object and a number of relatively-keyed objects, according to some embodiments of the invention.

As illustrated in FIG. 8, which is described in more detail below, in some embodiments, if an object is not symbolically-keyed, it is a relatively-keyed object. In some embodiments, an object gets its ontology in one of two ways. The first way is to take the ontology of the key field that is its center. If an object is related to a centered object, a second way is to take its ontology from the centered object plus its relation to that object. An object that takes its ontology from being related to a symbolically-keyed object is a relatively-keyed object.

Accordingly, placing the ontology logic at the key field level provides one location that includes the overall structure of the object. Other objects may refer to this object through its key. Therefore, the structure of this object may be updated in a single location and other objects may realign themselves with this new definition. The structure of the data of the object is not replicated throughout the system.

Additionally, the basic structure of the system is within the key fields, thereby allowing for an analysis of the system to be made based on access to these key fields. Now, a repository of these key fields and objects can serve up to report writers, dynamic inquiry systems, or drill-around just the user-oriented (symbolically-keyed) conceptual objects (company, vendor, invoice, check, and so on). The implementation complexity is now hidden from the analysis or conceptual view and yet the two are completely connected within the actual implementation.

Furthermore, placing the ontology logic at the key field level provides the ability to define an abstract key field of an object in the system (such as an object representative of an address) and use the definitions therein throughout the system. The relations, rules, and logic can be defined within these key fields and thus inherited by any object that uses these key fields.

Examples of classes from which the symbolically-keyed object 106 and the key field 102 are instantiated are shown in Appendices A-M, which are described in more detail below. In some embodiments, the classes shown in Appendices A-M are generated from a pattern language code, illustrated in FIGS. 2-7. Such code may be input into a pre-compiler logic to generate object-oriented code (for example, JAVA, C++ and so on). The generated object-oriented code may be compiled to generate an executable to be executed. In some embodiments, the key fields and the class definitions shown in Appendices A-M are based on the object-oriented paradigm.

Figure 14:
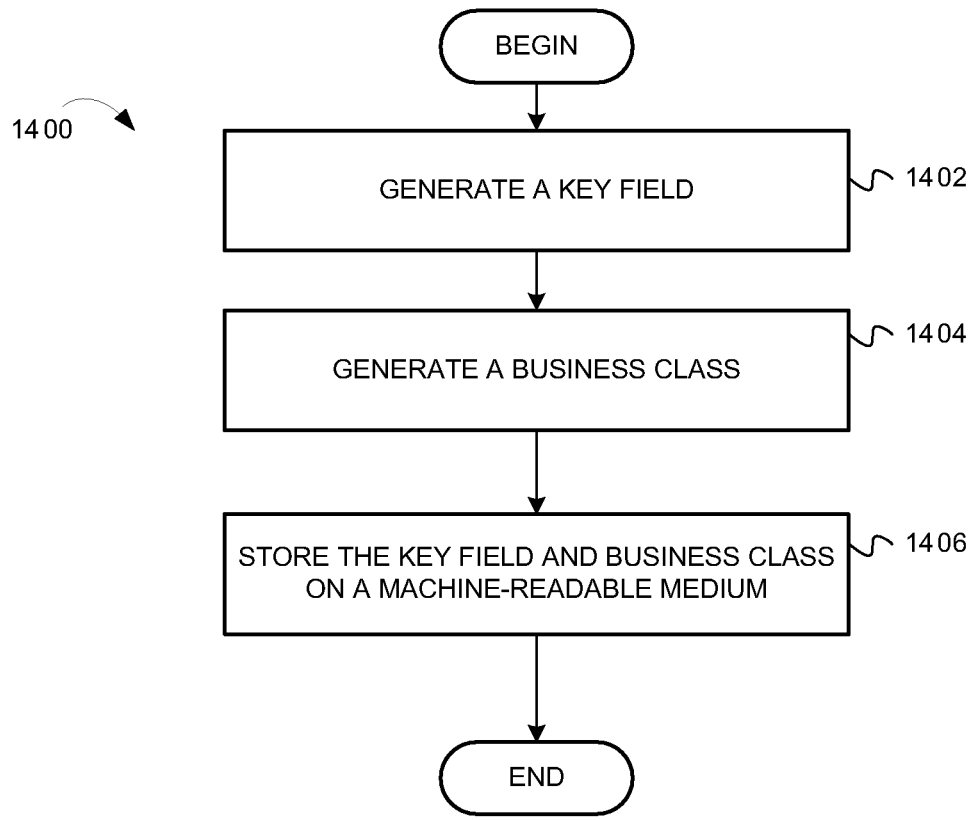
FIG. 14 illustrates a flow diagram for generating a key field and a business class, according to some embodiments of the invention.

FIG. 14 illustrates a flow diagram for generating a key field and a business class, according to some embodiments of the invention. A flow diagram 1400 includes an operation (at block 1402) to generate a key field. At block 1404, an business class is generated. At block 1406, the key field and the business class are stored on a machine-readable medium (for example, see the pattern language code 1016 in the persistent data store 1012 in FIG. 10).

FIG. 2A illustrates a class definition for a symbolically-keyed object representative of a company in a business application, according to some embodiments of the invention. In particular, FIG. 2A illustrates a class 200 that is a data structure, which, is representative of a "Company." The class 200 includes an ontology 202, patterns 204 and persistent fields 206. The ontology 202 helps to define the meaning of the class 200. The ontology 202 includes code 203 that defines a relationship between the class 200 and a key field "Company" (which is described in relation to FIG. 2B below). The patterns 204 includes code 205 that is to cause the generation of a number of functions as part of the class definition (a Create function, a Read function, an Update function, and a Delete function). The persistent fields 206 include code 207 that is to cause the generation of a variable "Name" (which is of type "Alpha" and size 30) as part of the class definition. One embodiment of the generated object-oriented code for the class 200 is shown in Appendix A.

FIG. 2B illustrates a class definition for a key field having an ontology logic and representative of a company in a business application, according to some embodiments of the invention. In particular, FIG. 2B illustrates a key field 220 that is a data structure, which, is representative of a "Company." The key field 220 includes a representation 222 and an ontology 224. The representation 222 includes code 223 that is to cause the generation variable of a type Alpha of size 10, which is a representative variable name for the key field. Accordingly, the representation 222 may be a character string having a size of 10. The ontology 224 defines the meaning of the key field 220. The ontology 224 includes code 226 that defines a relationship between the key field 220 and the class 200

"Company." Accordingly, the code 203 in the class 200 and the code 226 in the key field 220 define a relationship between the class 200 and the key field 220. One embodiment of the generated object-oriented code for the key field 220 is shown in Appendix B.

FIG. 3A illustrates a class definition for a symbolically-keyed object representative of a human resources data in a company in a business application, according to some embodiments of the invention. In particular, FIG. 3A illustrates a class 300 that is a data structure, which, is representative of a "Human Resources (HR) Company Data." The class 300 includes an ontology 302, patterns 304, persistent fields 306 and field rules 308.

The ontology 302 helps to define the meaning of the class 300. The ontology 302 includes code 303 that defines a relationship between the class 300 and a key field "HRCompany" (which is described in relation to FIG. 3B below). The patterns 304 include code 305 that is to cause the generation of a number of functions as part of the class definition (a Create function, a Read function, an Update function and a Delete function).

The persistent fields 306 include code 310, 311 and 312. The code 310 and 311 cause the generation of a variable "Name" (which is of type "Alpha" and size 30) and "LastEmployee" (which is of type "Numeric and size nine), respectively, as part of the class definition. The code 312 defines a persistent field, "AutoSequence (which is of type "Alpha" and size one) that includes a state rule. In particular, a state rule defines what the valid values of the field are. In this case, the state rule defines that "AutoSequence" can only have the values "Yes" (which is codified as "Y") and "No" (which is codified as "N").

The field rules 308 include code 314 that requires the Name field is to include a value. Objects interacting with the Name field are precluded from performing operations that cause the Name field to be blank. The field rules 308 also includes code 316 that requires that if the Autosequence field is left blank, such field should be set to the value of "AutoSequence.No", which was specified in the code 312 to be "N." One embodiment of the generated object-oriented code for the class 200 is shown in Appendix C.

FIG. 3B illustrates a class definition for a key field having an ontology logic and representative of human resources in a company in a business application, according to some embodiments of the invention. In particular, FIG. 3B illustrates a key field 320 that is a data structure, which is representative of a human resources department in a company. The key field 220 includes code 322 that causes the key field to inherit the components of the key field for Company (as shown in FIG. 2B). For example, the key field 320 includes the ontology 224.

The key field 324 also includes an ontology 324. The ontology 324 includes code 326 that defines a relationship between the key field 320 and the class 300 "HRCompanyData." Accordingly, the code 303 in the class 300 and the code 326 in the key field 320 define a relationship between the class 300 and the key field 320. One embodiment of the generated object-oriented code for the key field 320 is shown in Appendix D.

FIG. 4A illustrates a class definition for a symbolically-keyed object representative of an employee in a company in a business application, according to some embodiments of the invention. In particular, FIG. 4A illustrates a class 400 that is a data structure, which, is representative of an employee "EmployeeMaster." The class 400 includes an ontology 402, patterns 406, persistent fields 410, derived fields 414 and field rules 418.

The ontology 402 includes code 404 that defines a relationship between the class 400 and a key field "Employee" (which is described in relation to FIG. 4B below). The patterns 406 includes code 408 that is to cause the generation of a number of functions as part of the class definition (a Create function, a Read function, an Update function and a Delete function).

The persistent fields 410 include code 412 that is to cause the generation of a number of variables as part of the class definition. The variables include the name, address, country where employee works (WorkCountry), the primary pay area (such as a given state) (PrimaryPayArea) and the secondary pay area (SecondaryPayArea).

The derived fields 414 include code 416, which defines a derived or computed field "StandardWeeklyPay" that is defined as a computation of the PayRate field times 40 (hours per week). Whenever this derived field is referred to it may run this calculation and return the result. The field rules 418 includes code 418 that require that an instantiated "employee" object include name, address, work country and a primary pay area. One embodiment of the generated object-oriented code for the class 400 is shown in Appendix E.

FIG. 4B illustrates a class definition for a key field having an ontology logic and representative of an employee in a company in a business application, according to some embodiments of the invention. In particular, FIG. 4B illustrates a key field 430 that is a data structure, which is representative of an employee in a company. The key field 430 includes a representation 432, an ontology 436 and field rules 444. The representation 432 includes code 434 that is to cause the generation variable of a type Numeric of size nine, which is a representative variable name for the key field. Accordingly, the representation 432 may be a numeric value having a size of nine.

The ontology 436 defines the meaning of the key field 430. The ontology 436 includes code 438 that defines a relationship between the key field 430 and the class 400 "EmployeeMaster." Accordingly, the code 404 in the class 400 and the code 438 in the key field 430 define a relationship between the class 400 and the key field 430. The field rules 444 include code 446, which specifies that if the field "Company.AutoSequence" has the value "Yes" (a "Y") then whenever a new Employee is being added the value of the Employee field should be determined by retrieving the last Employee number used from "Company.LastEmployee" and adding one to such value. This rule also may update the "Company.LastEmployee" field to contain this new Employee. One embodiment of the generated object-oriented code for the key field 430 is shown in Appendix F.

FIG. 4C illustrates a class definition for a symbolically-keyed object representative of a dependent of an employee in a company in a business application, according to some embodiments of the invention. In particular, FIG. 4C illustrates a class 450 that is a data structure, which, is representative of a dependent of an employee "EmployeeDependent." The class 450 includes an ontology 452, patterns 458, persistent fields 462 and derived fields 466.

The ontology 452 includes code 454 that defines a relationship between the class 400 and the class 450. In particular, the ontology 452 indicates that "EmployeeDependent" is part of the "EmployeeMaster." Additionally, the ontology 452 includes code 456, which indicates that the relative key for the class 450 is "Name" (which is of type "Alpha" and size 30). The patterns 458 includes code 460 that is to cause the generation of a number of functions as part of the class definition (a Create function, a Read function, an Update function and a Delete function).

The persistent fields 462 include code 464 that is to cause the generation of a variable "BirthDate" as part of the class definition. The derived fields 466 include code 468, which defines a derived or computed field "Age" that is defined as a computation of the current date minus the BirthDate. Whenever this derived field is referred to it may run this calculation and return the result. One embodiment of the generated object-oriented code for the class 400 is shown in Appendix G.

FIG. 5A illustrates a class definition for a symbolically-keyed object representative of a pay code in a company in a business application, according to some embodiments of the invention. In particular, FIG. 5A illustrates a class 500 that is a data structure, which, is representative of a pay code ("PayCodeTable"). The class 500 includes an ontology 502, patterns 506 and persistent fields 510.

The ontology 502 includes code 504 that defines a relationship between the class 500 and a key field "PayCode" (which is described in relation to FIG. 5B below). The patterns 506 includes code 508 that is to cause the generation of a number of functions as part of the class definition (a Create function, a Read function, an Update function and a Delete function).

The persistent fields 510 include code 512 that is to cause the generation of a number of variables as part of the class definition. The variables include a description and a payrate. One embodiment of the generated object-oriented code for the class 400 is shown in Appendix H.

FIG. 5B illustrates a class definition for a key field having an ontology logic and representative of a pay code in a company in a business application, according to some embodiments of the invention. In particular, FIG. 5B illustrates a key field 520 that is a data structure, which is representative of a pay code for different employees in a company. The key field 520 includes a representation 522 and an ontology 526. The representation 522 includes code 524 that is to cause the generation variable of a type Alpha of size five, which is a representative variable name for the key field.

The ontology 530 defines the meaning of the key field 522. The ontology 530 includes code 528 that defines a relationship between the key field 520 and the class 500 "PayCodeTable." Accordingly, the code 504 in the class 500 and the code 528 in the key field 520 define a relationship between the class 500 and the key field 520.

The ontology 530 also includes a context 530 of "HRCompany", optionally "CountryCode" and optionally "Region." Accordingly, a "PayCode" exists only within the context of an "HRCompany" object, optionally a "CountryCode object and optionally a "Region" object. "PayCode" is afforded by an "HRCompany" object, optionally a "CountryCode object and optionally a "Region" object. In other words, "PayCode" only has meaning within the context of an "HRCompany" object, optionally a "CountryCode object and optionally a "Region" object. This context 530 creates a one-to-one required relation from the object centered on the "PayCode" to the object centered on the "HRCompany", optionally the object centered on the "CountryCode" and the object centered on the "Region."

Therefore, an aspect of this definitional structure is that "PayCode" as a field by itself does not have its full meaning without being in some context where "HRCompany" is present. Moreover, the responsibility for determining this context is implicitly left to the "PayCode" field. Therefore after the "PayCode" keyfield is introduced into some context (a screen, a group field, a business object, and so on), this keyfield takes on the responsibility for examining the surrounding context and determining the most appropriate "HRCompany" field with which to be associated. This defines a semantic plug-and-play protocol that disambiguates dynamically based on context. This resolution of the appropriate "HRCompany" may be performed at runtime. One example of this runtime resolution is described in more detail in U.S. patent application Ser. No. 10/857,343 (issued as U.S. Pat. No. 8,874,614), entitled "METHOD AND SYSTEM FOR ENFORCING ONTOLOGICAL CONTEXT RULES FOR OBJECT-ORIENTED PROGRAMS", which is assigned to the assignee of the embodiments disclosed herein, Lawson Software, Inc., which is hereby incorporated by reference. One embodiment of the generated object-oriented code for the key field 520 is shown in Appendix I.

FIG. 6A illustrates a class definition for a symbolically-keyed object representative of a country in a business application, according to some embodiments of the invention. In particular, FIG. 6A illustrates a class 600 that is a data structure, which, is representative of a country "Country." The class 600 includes an ontology 602, patterns 606 and persistent fields 610.

The ontology 602 includes code 604 that defines a relationship between the class 600 and a key field "CountryCode" (which is described in relation to FIG. 6B below). The patterns 606 includes code 608 that is to cause the generation of a number of functions as part of the class definition (a Create function, a Read function, an Update function and a Delete function).

The persistent fields 610 include code 612 that is to cause the generation of a variable as part of the class definition. The variable is "Name" which is of type "Alpha" of a size of 50. One embodiment of the generated object-oriented code for the class 600 is shown in Appendix J.

FIG. 6B illustrates a class definition for a key field representative of a country code in a business application, according to some embodiments of the invention. In particular, FIG. 6B illustrates a key field 620 that is a data structure, which is representative of a country code for a business application. The key field 620 includes a representation 622 and an ontology 626. The representation 622 includes code 624 that is to cause the generation variable of a type Alpha of size two, which is a representative number for the key field.

The ontology 626 defines the meaning of the key field 620. The ontology 626 includes code 628 that defines a relationship between the key field 620 and the class 600 "Country." Accordingly, the code 604 in the class 600 and the code 628 in the key field 620 define a relationship between the class 600 and the key field 620. One embodiment of the generated object-oriented code for the key field 620 is shown in Appendix K.

FIG. 7A illustrates a class definition for a symbolically-keyed object representative of a region in a business application, according to some embodiments of the invention. In particular, FIG. 7A illustrates a class 700 that is a data structure, which, is representative of a "Region" in a country. For example, one object may be instantiated for the West region of the United States. The class 700 includes an ontology 701, patterns 704, persistent fields 706 and field rules 708.

The ontology 702 includes code 704 that defines a relationship between the class 700 and a key field "Region" (which is described in relation to FIG. 7B below). The patterns 706 includes code 708 that is to cause the generation of a number of functions as part of the class definition (a Create function, a Read function, an Update function and a Delete function). The persistent fields 710 include code 712 that is to cause the generation of a variable as part of the class definition. The variable is "Name" which is of type "Alpha" of a size of 50. The field rules 713 include code 714 that requires that the Name field is to be entered (and is not to be undefined). One embodiment of the generated object-oriented code for the class 700 is shown in Appendix L.

FIG. 7B illustrates a class definition for a key field representative of a region in a business application, according to some embodiments of the invention. In particular, FIG. 7B illustrates a key field 720 that is a data structure, which is representative of a country code for a business application. The key field 720 includes a representation 722 and an ontology 726. The representation 722 includes code 724 that is to cause the generation variable of a type Alpha of size 10, which is a representative variable for the key field 720.

The ontology 726 defines the meaning of the key field 720. The ontology 726 includes code 728 that defines a relationship between the key field 720 and the class 700 "Region." Accordingly, the code 704 in the class 700 and the code 728 in the key field 720 define a relationship between the class 700 and the key field 720.

The ontology 726 also includes a context 730 of "CountryCode." Accordingly, a "Region" exists only within the context of a "CountryCode" object. "Region" is afforded by a "CountryCode" object. In other words, "Region" only has meaning within the context of a "CountryCode" object. This context 730 creates a one-to-one required relation from the object centered on the Region" to the object centered on the CountryCode. One embodiment of the generated object-oriented code for the key field 720 is shown in Appendix M.

FIG. 8 illustrates a diagrammatic representation of a relationship between a key field, a symbolically-keyed object and a number of relatively-keyed objects, according to some embodiments of the invention. In particular, FIG. 8 illustrates a conceptual object 802. The conceptual object 802 includes a symbolically-keyed object 804, a key field 806 and a number of relatively-keyed objects (A-N) 808A-808N. A key field 806 is coupled to the symbolically-keyed object 804. The symbolically-keyed object 804 is coupled to the relatively-keyed objects (A-N) 808A-808N.

A relatively-keyed object is a component or part of a conceptual object that is accessed through the symbolically-keyed object. To help illustrate, the conceptual object 802 may be representative of a purchase order for a business. Accordingly, the symbolically-keyed object 804 is a representation of the purchase order (through for example a given numerical identification). The key field 806 is used to reference this purchase order. The relatively-keyed objects (A-N) 808A-808N may be different lines on the purchase order. Therefore, line three of purchase order 95601 may be accessed through the key field for the symbolically-keyed object for this purchase order to access the relatively-keyed object that is representative of line three of the purchase order. Accordingly, the relatively-keyed objects need a context of a given symbolically-keyed object.

While FIGS. 1-8 describe relationships among key fields and symbolically key objects and a database table for storage of these key fields, FIGS. 9-13 describe a system architecture and operations related to the creation of a pattern language and generation of object-oriented code and an executable therefrom, according to some embodiments of the invention.

Figure 9:
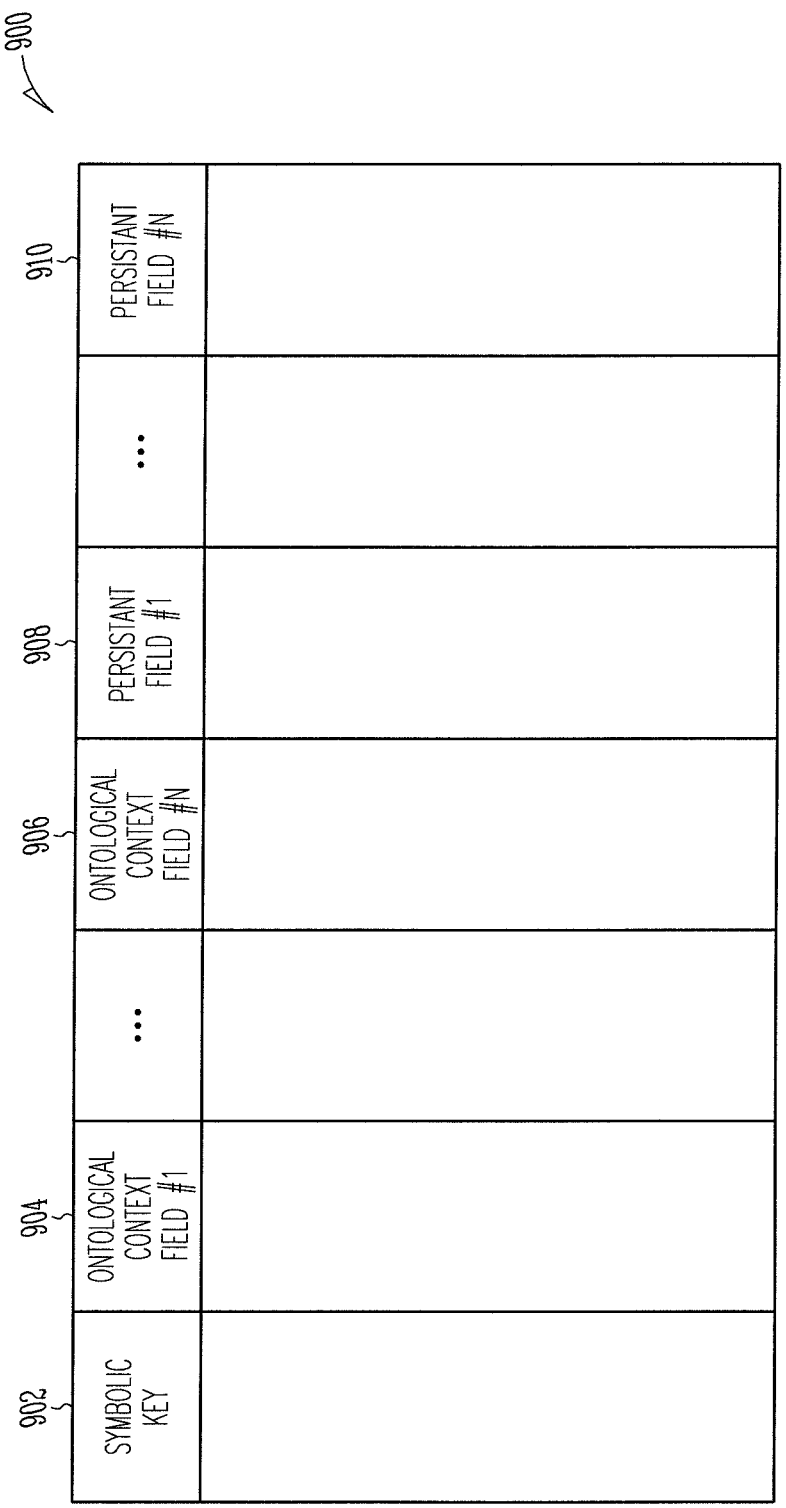
FIG. 9 illustrates a table in a database that is for storage of a number of symbolically-keyed objects for a given class, according to some embodiments of the invention.

FIG. 9 illustrates a table in a database that is for storage of a number of symbolically-keyed objects for a given class, according to some embodiments of the invention. In particular, FIG. 9 illustrates a table 900 that includes a symbolic key column 902, an ontological context field #1 column 904, an ontological context field #N column 906, a persistent field #1 column 908 and a persistent field #N column 910. As shown, the class for the table 900 may include one to a number of different ontological contexts and one to a number of different persistent fields.

Figure 10:
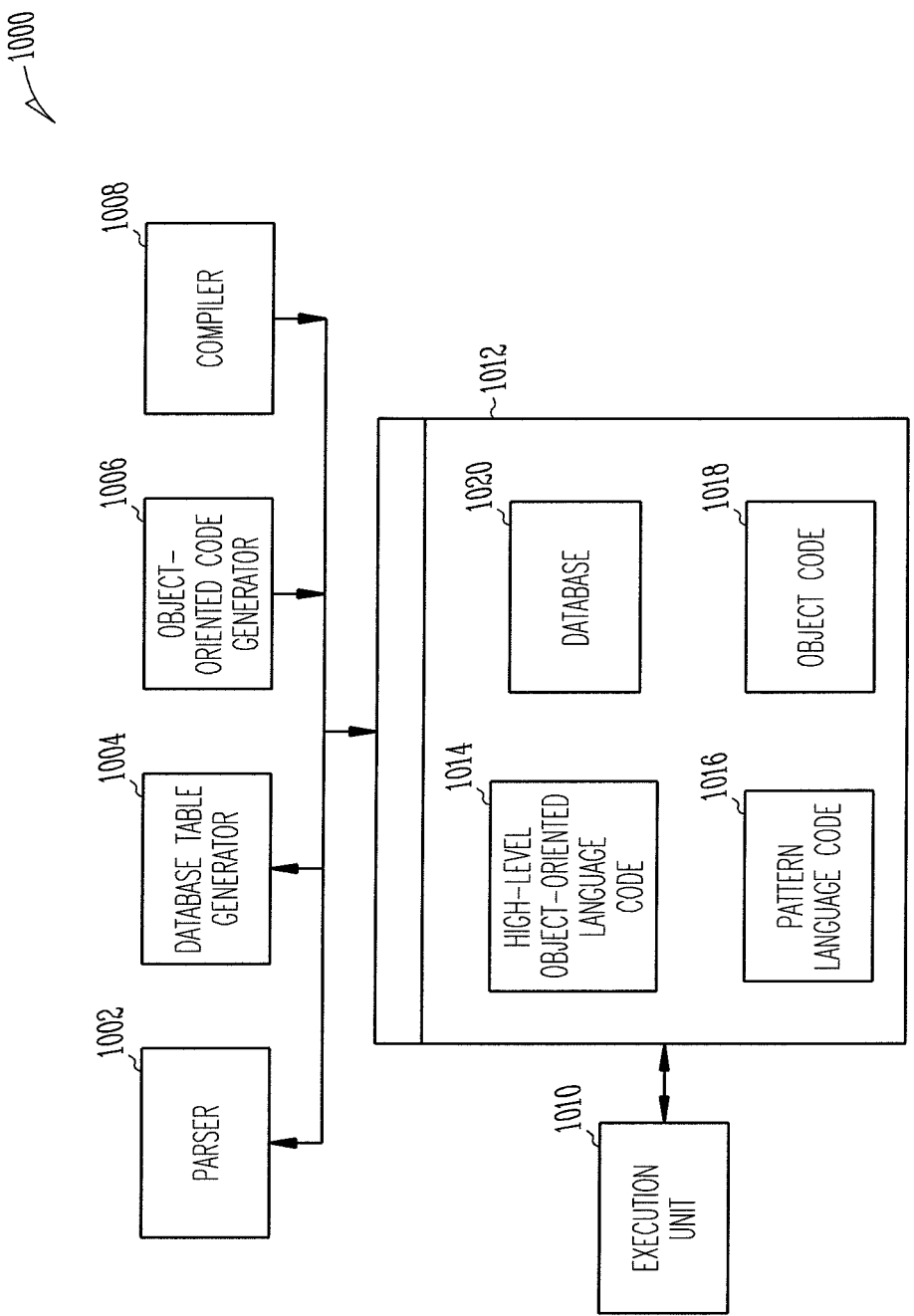
FIG. 10 is a block diagram illustrating a system for creation and processing of a pattern language that includes key fields and symbolically-keyed objects, according to some embodiments of the invention.

FIG. 10 is a block diagram illustrating a system for creation and processing of a pattern language that includes key fields and symbolically-keyed objects, according to some embodiments of the invention. Operations for the system will be described in greater detail below, in the discussion of FIGS. 11-12. As shown in FIG. 10, a system 1000 includes a persistent data store 1012. During different parts of the operations described below, the persistent data store 1012 may store none, less than all or all of the following: a high-level object-oriented language code 1014, a pattern language code 1016, an object code 1018 and a database 1020.

The persistent data store 1012, a parser 1002, a database table generator 1004, an object-oriented code generator 1006 and a compiler 1008 are coupled together. A software developer may create and store the pattern language code 1016 into the persistent data store 1012. The parser 1002 may parse the pattern language code 1016 to generate dictionary tables for the different key field/associated class. Based on the dictionary tables, the database table generator 1004 may generate one to a number of different database tables for storage into the database 1020. An example database table is shown in FIG. 5, which is described above.

The object-oriented code generator 1006 may generate high-level object-oriented code 1014 based on the pattern language code 1016. The compiler 1008 may generate the object code 1018 based on the high-level object-oriented code 1014. The persistent data store 1012 is also coupled to an execution unit 1010. In some embodiments, the execution unit 1010 contains all elements necessary for executing the object code 1018. For example, the execution unit 1010 may contain a processor, memory, and software, such as a JAVA runtime environment (available from Sun Microsystems of Santa Clara, Calif.).

Any of the functional units shown in FIG. 10 or otherwise used in conjunction with embodiments of the invention can include machine-readable media including instructions for performing operations described herein. Machine-readable media includes any mechanism that provides (that is, stores and/or transmits) information in a form readable by a machine (for example, a computer). For example, a machine-readable medium includes read only memory (ROM), random access memory (RAM), magnetic disk storage media, optical storage media, flash memory devices. According to embodiments of the invention, the functional units can be other types of logic (for example, digital logic) for executing the operations described herein.

Figure 11:
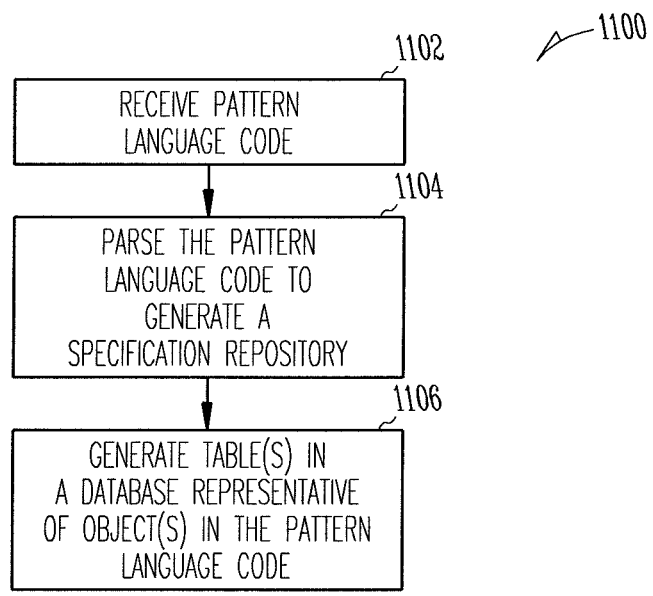
FIG. 11 illustrates a flow diagram for generation of tables in a database for storage of symbolically-keyed objects, according to some embodiments of the invention.

FIG. 11 illustrates a flow diagram for generation of tables in a database for storage of symbolically-keyed objects, according to some embodiments of the invention. In particular, the flow diagram 1100 describes a number of operations that may be performed by the system 1000.

Any of the functional units shown in FIG. 10 or otherwise used in conjunction with embodiments of the invention can include machine-readable media including instructions for performing operations described herein. Machine-readable media includes any mechanism that provides (that is, stores and/or transmits) information in a form readable by a machine (for example, a computer). For example, a machine-readable medium includes read only memory (ROM), random access memory (RAM), magnetic disk storage media, optical storage media, or flash memory devices. According to embodiments of the invention, the functional units can be other types of logic (for example, digital logic) for executing the operations described herein.

In block 1104, the pattern language code is parsed to generate a specification repository. With reference to the embodiment of FIG. 10, the parser 1002 may parse the pattern language code to generate the specification repository. The specification repository may include different class definitions based on the pattern language code. The specification repository may be a network of classes where the intricate relationships expressed in the pattern language are explicitly resolved. In some embodiments, the parser 1002 may generate an unresolved specification repository that includes the different class definitions. The parser 1002 may then generate a resolved specification repository that includes the different class definitions along with the links between the related class definitions based on how such class definitions are defined in the pattern language code. For example, the links between the different objects in FIG. 8 are part of the resolved specification repository during a parse operation for those objects. Control continues at block 1106.

In block 1106, table(s), which are representative of object(s) in the pattern language code, are generated in a database. With reference to the embodiment of FIG. 10, the database table generator 1004 may generate the table(s) in the database 1020 in the persistent data store 1012. One embodiment of a table stored in the database 1020 and which is representative of an object is illustrated in FIG. 9. Accordingly, in some embodiments, a database table is created and stored in a persistent data store for each of the different objects in the pattern language code. In some embodiments, these database tables are initially empty. As further described in conjunction with the flow diagram 1200 of FIG. 12, object-oriented code is generated based on the pattern language code. During subsequent execution of the object-oriented code, data for the different objects is created and may be stored in the appropriate database table. The operations of the flow diagram 1100 are complete.

Figure 12:
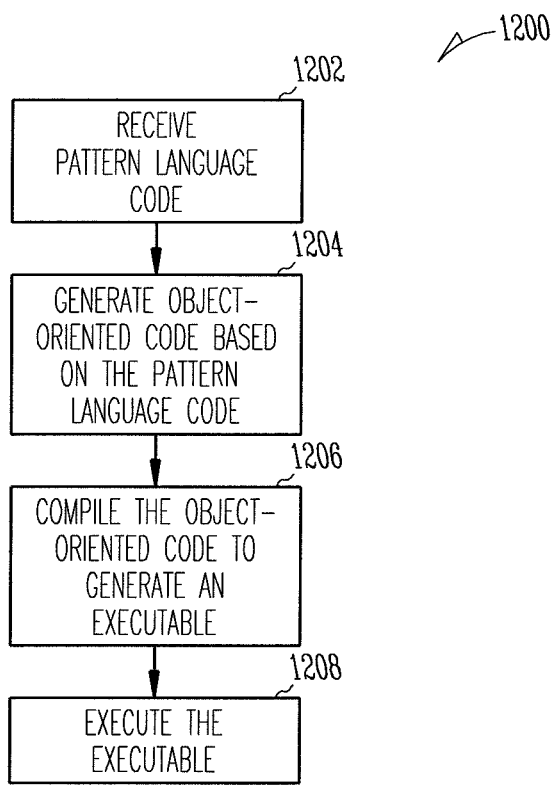
FIG. 12 illustrates a flow diagram for creation and execution of a software application that is designed based on key fields and associated symbolically-keyed objects, according to some embodiments of the invention.

FIG. 12 illustrates a flow diagram for creation and execution of a software application that is designed based on key fields and associated symbolically-keyed objects, according to some embodiments of the invention. In particular, the flow diagram 1200 describes a number of operations that may be performed by the system 1000.

In block 1202, pattern language code is received. With reference to the embodiment of FIG. 10, the object-oriented code generator 1006 receives the pattern language code. Examples of the different pattern language code are illustrated in FIGS. 1-7. Control continues at block 1204.

In block 1204, object-oriented code is generated based on the pattern language code. With reference to the embodiment of FIG. 10, the object-oriented code generator 1006 may generate the object-oriented code based on the pattern language code. The object-oriented code may include different class definitions as illustrated in Appendices A-M. Control continues at block 1206.

In block 1206, the object-oriented code is compiled to generate an executable. With reference to the embodiment of FIG. 10, the compiler 1008 may compile the object-oriented code to generate the executable. Control continues at block 1208.

In block 1208, the executable is executed. With reference to the embodiment of FIG. 10, the execution unit 1010 may execute the executable. As described above, as part of the execution, data for different objects created based on the different class definitions may be stored in the database tables that are stored in the database 1020. The operations of the flow diagram 1200 are complete.

Figure 13:
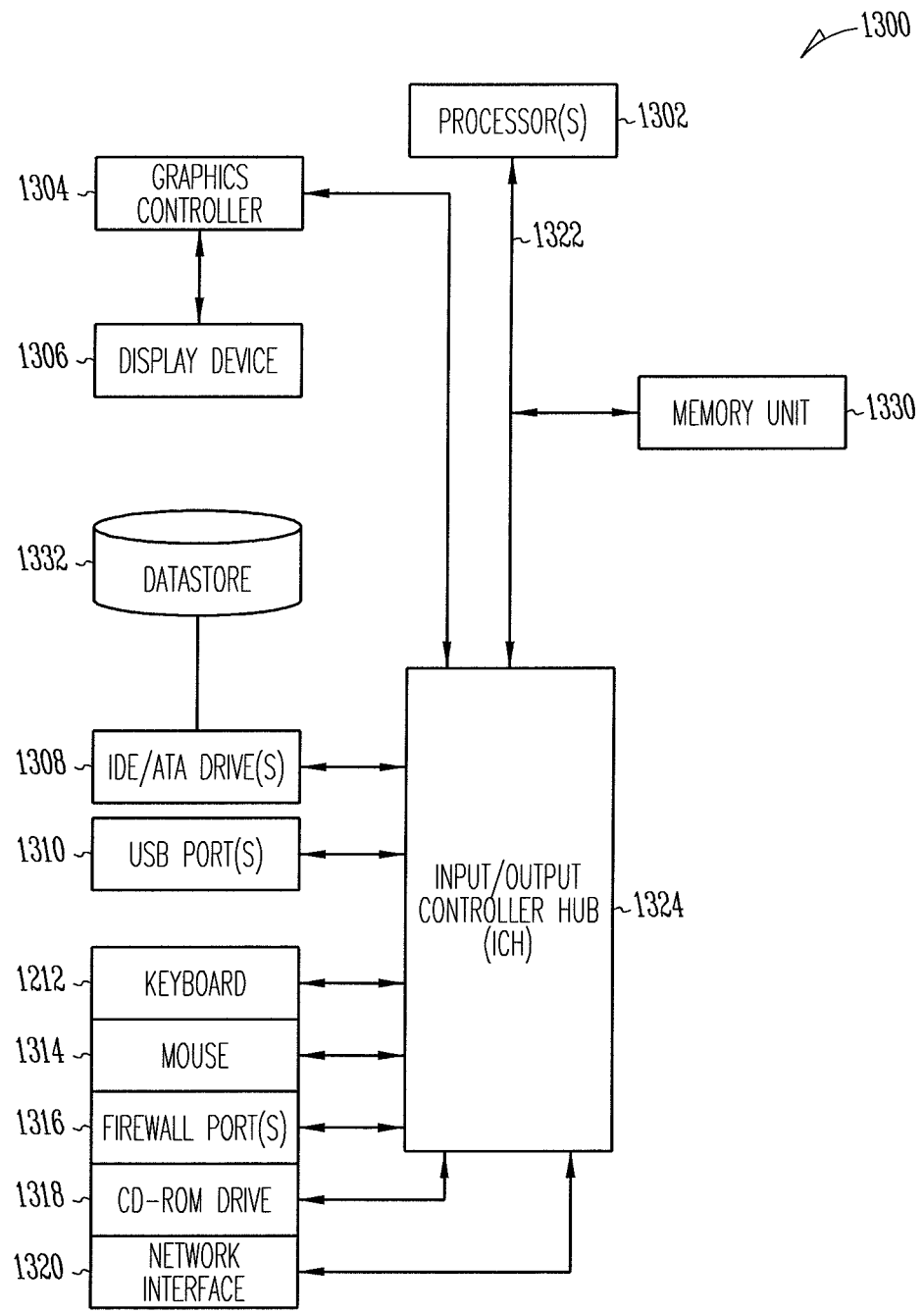
FIG. 13 illustrates an exemplary computer system used with certain embodiments of the invention.

This section provides an overview of the exemplary hardware and the operating environment in which embodiments of the invention can be practiced. FIG. 13 illustrates an exemplary computer system used in conjunction with certain embodiments of the invention. As illustrated in FIG. 13, computer system 1300 comprises processor(s) 1302. The computer system 1300 also includes a memory unit 1330, processor bus 1322, and Input/Output controller hub (ICH) 1324. The processor(s) 1302, memory unit 1330, and ICH 1324 are coupled to the processor bus 1322. The processor(s) 1302 may comprise any suitable processor architecture. The computer system 1300 may comprise one, two, three, or more processors, any of which may execute a set of instructions in accordance with at least some embodiments of the invention.

In one embodiment, the computer system 1300 includes a machine-readable medium that stores a set of instructions (for example, software) embodying any one, or all, of the methodologies for dynamically retrieving ontological context. For example, the parser 1002, the database table generator 1004, the object-oriented code generator 1006, the compiler 1008 and/or the execution unit 1010 may be software.

The memory unit 1330 stores data and/or instructions, and may comprise any suitable memory, such as a dynamic random access memory (DRAM), for example. The computer system 1300 also includes IDE drive(s) 1308 and/or other suitable storage devices. Although not shown, the memory unit 1330, the processor(s) 1302 and/or the IDE drive(s) 1308 may include at least a part of the parser 1002, the database table generator 1004, the object-oriented code generator 1006, the compiler 1008, the execution unit 1010, the high-level object-oriented language code 1014, the pattern language code 1016, the database 1020 and/or the object code 1018. A graphics controller 1304 controls the display of information on a display device 1306, according to embodiments of the invention.

The input/output controller hub (ICH) 1324 provides an interface to I/O devices or peripheral components for the computer system 1300. The ICH 1324 may comprise any suitable interface controller to provide for any suitable communication link to the processor(s) 1302, memory unit 1330 and/or to any suitable device or component in communication with the ICH 1324. For one embodiment of the invention, the ICH 1324 provides suitable arbitration and buffering for each interface.

For one embodiment of the invention, the ICH 1324 provides an interface to one or more suitable integrated drive electronics (IDE) drives 1308, such as a hard disk drive (HDD) or compact disc read only memory (CD ROM) drive, or to suitable universal serial bus (USB) devices through one or more USB ports 1310. For one embodiment, the ICH 1324 also provides an interface to a keyboard 1312, a mouse 1314, a CD-ROM drive 1318, one or more suitable devices through one or more firewire ports 1316. For one embodiment of the invention, the ICH 1324 also provides a network interface 1320 though which the computer system 1300 can communicate with other computers and/or devices.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment," "an embodiment," "an example embodiment," and so on, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (that is, stores and/or transmits) information in a form accessible by a machine (for example, a computer, a network device, a personal digital assistant, manufacturing tool, any device with a set of one or more processors, and so on). In an exemplary embodiment, a machine-readable medium includes volatile and/or non-volatile media (for example, read-only memory (ROM), random access memory (RAM), magnetic disk storage media, optical storage media, flash memory devices, and so on), as well as electrical, optical, acoustical or other form of propagated signals (for example, carrier waves, infrared signals, digital signals, and so on)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for ontology context logic at the key field level, in accordance with embodiments of the invention. A number of figures show flow diagrams illustrating operations for ontology context logic at the key field level, in accordance with embodiments of the invention. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method executed by a processor comprising:
generating a key field that is a symbolic way of referring to a business class, the key field having an ontology logic that includes a context for the business class and an equivalency between the key field and the business class;
generating the business class, the business class having an ontology logic that includes the equivalency between the key field and the business class; and
storing the key field and the business class on a machine-readable medium.

2. The method of claim 1, wherein generating the key field comprises creating the key field that includes at least one field rule.

3. The method of claim 1, further comprising generating code based on the key field and the business class.

4. The method of claim 3, wherein generating code based on the key field and the business class comprises generating object-oriented code based on the key field and the business class.

5. The method of claim 3, further comprising compiling the code to generate an executable file.

6. The method of claim 5, executing the executable file.

7. A method executed by a processor comprising:
receiving a pattern language code that includes a business class and a key field that is a symbolic way of referring to the business class, the key field having an ontology logic that includes a context for the business class and an equivalency between the key field and the business class, wherein the context in the ontology logic is to enforce a context for a business object generated from the business class during execution of the program code; parsing the pattern language code to generate a dictionary table; and
generating at least one table in a database representative of at least one object in the pattern language code based on the dictionary table.

8. The method of claim 7, wherein receiving the pattern language code that includes the business class and the key field comprises receiving the pattern language code that includes the key field that includes at least one field rule.

9. A non-transitory machine-readable storage medium that provides instructions, which when executed by a machine, cause said machine to perform operations comprising:
creating, by a processor in the machine, a key field that is a symbolic way of referring to a business class, the key field having an ontology logic that includes a context for the business class and an equivalency between the key field and the business class;
creating, by the processor in the machine, the business class, the business class having an ontology logic that includes the equivalency between the key field and the business class; and storing, by the processor in the machine, the key field and the business class on at least one of the machine-readable medium or a different machine-readable medium.

10. The machine-readable storage medium of claim 9, wherein creating the key field comprises creating the key field that includes at least one field rule.

11. The machine-readable storage medium of claim 9, further comprising, by the processor in the machine, generating code based on the key field and the business class.

12. The machine-readable storage medium of claim 11, wherein generating code based on the key field and the business class comprises generating object-oriented code based on the key field and the business class.

13. The machine-readable storage medium of claim 11, further comprising compiling, by the processor in the machine, the code to generate an executable file.

14. The machine-readable storage medium of claim 13, executing, by the processor in the machine, the executable file.

15. A non-transitory machine-readable storage medium encoded with program code, the program code comprising:

a business class; and a key field that is a symbolic way of referring to the business class, the key field having an ontology logic that includes a context for the business class and an equivalency between the key field and the business class, wherein the context in the ontology logic is to enforce a context for the business class generated from the business class during execution of the program code.

16. The machine-readable storage medium of claim 15, wherein the business class includes an ontology logic that includes an equivalency between the key field and the business class.

17. A non-transitory machine-readable medium that provides instructions, which when executed by a machine, cause said machine to perform operations comprising:
receiving, by a processor in the machine, a pattern language code that includes a business class and a key field that is a symbolic way of referring to the business class, the key field having an ontology logic that includes a context for the business class and an equivalency between the key field and the business class, wherein the context in the ontology logic is to enforce a context for a business object generated from the business class during execution of the program code;
parsing, by the processor in the machine, the pattern language code to generate a dictionary table; and generating, by the processor in the machine, at least one table in a database representative of at least one object in the pattern language code based on the dictionary table.

18. The machine-readable medium of claim 17, wherein receiving the pattern language code that includes the business class and the key field comprises receiving the pattern language code that includes the key field that includes at least one field rule.

19. A non-transitory machine-readable storage medium encoded with program code, the program code comprising:
a conceptual object that comprises: a relatively-keyed object; a symbolically-keyed object; and a key field that is a symbolic way of referring to the symbolically-keyed object, the key field having an ontology logic that includes a context for the symbolically-keyed object and an equivalency between the key field and the symbolically-keyed object, wherein the context in the ontology logic is to enforce a context for the symbolically-keyed object during execution of the program code.

20. The machine-readable storage medium of claim 19, wherein the relatively keyed object is accessible through the key field of the symbolically-keyed object during execution of the program code.

21. The machine-readable storage medium of claim 19, wherein a context of the relatively-keyed object includes the context for the symbolically-keyed object.

22. The machine-readable storage medium of claim 19, wherein the symbolically-keyed object includes an ontology logic that includes an equivalency between the key field and the symbolically-keyed object.

23. A system comprising:
at least one processor in a computer;
a persistent data store to store pattern language code that includes a business class and a key field having an ontology logic that includes a context for the business class and an equivalency between the key field and the business class; and
an object-oriented language generator, executed by the at least one processor in the computer, to generate object-oriented language code from the pattern language code, wherein the object-oriented language code includes definitions of business classes and key fields, the key fields comprising symbolic ways of referring to the business classes, wherein the context in the ontology logic is to enforce a context for the business object generated from the business class during execution of the object-oriented code.

24. The system of claim 23, wherein the object-oriented language code is Java.

25. The system of claim 23, further comprising a compiler to generate an executable file based on the object-oriented code.

26. The system of claim 25, further comprising an execution unit to execute the executable file.

27. The system of claim 23, wherein the key field includes at least one field rule.

* * * * *